United States Patent [19]

Bursack

[11] 3,992,626

[45] Nov. 16, 1976

[54] TEST INSTRUMENT

[75] Inventor: William W. Bursack, Minneapolis, Minn.

[73] Assignee: Honeywell Inc., Minneapolis, Minn.

[22] Filed: Apr. 26, 1973

[21] Appl. No.: 354,707

Related U.S. Application Data

[63] Continuation of Ser. No. 228,782, Feb. 23, 1973, abandoned, which is a continuation of Ser. No. 751,236, Aug. 8, 1968, abandoned.

[52] U.S. Cl. .................................. 250/288; 250/289

[51] Int. Cl.[2] .......................................... B01D 59/44

[58] Field of Search .............. 230/69; 250/288, 289, 250/292, 427; 313/175, 231

[56] References Cited

UNITED STATES PATENTS

| | | | |
|---|---|---|---|
| 2,829,259 | 4/1958 | Foner et al. | 250/288 |
| 3,080,754 | 3/1963 | Johnson | 250/288 |
| 3,413,463 | 11/1968 | Brubaker | 250/292 |

*Primary Examiner*—Alfred E. Smith
*Assistant Examiner*—T. N. Grigsby

[57] ABSTRACT

A mass spectrometer, including a getter-ion pump, in which the sample to be studied is admitted to the spectrometer in pulses at spaced intervals, the rate of gas admission being so chosen, with respect to the pulse duration and interpulse interval, that the amount of gas admitted during each pulse does not exceed the capacity of the ion-getter pump to remove in the interval before the next pulse. The average gas density accordingly does not vary unduly, while the ion concentration during the pulses is appreciably greater than the average ion concentration, and the interior of the spectrometer is in substantially free communication with the gas to be analyzed during the pulses.

1 Claim, 2 Drawing Figures

FIG. 1
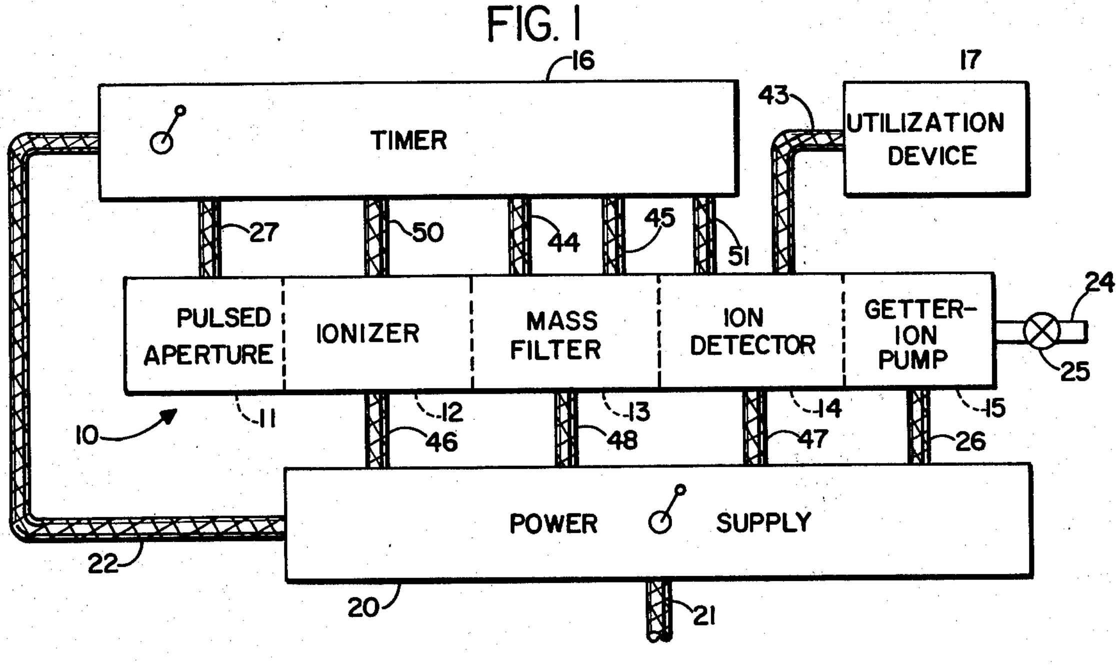
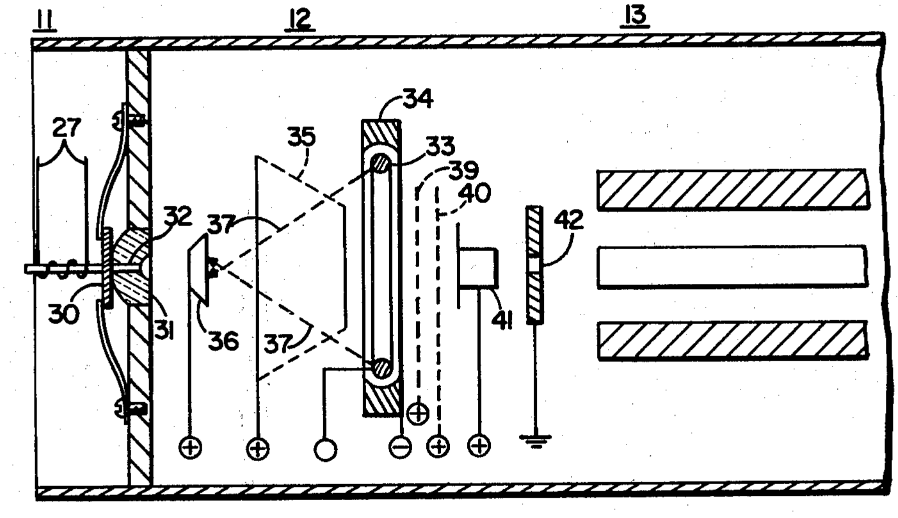
FIG. 2
INVENTOR.
WILLIAM W. BURSACK
BY George Field

TEST INSTRUMENT

This application is a continuation of application having U.S. Ser. No. 228,782, filed Feb. 23, 1972, and now abandoned, which in turn is a continuation of an application having U.S. Ser. No. 751,236, filed Aug. 8, 1968, now abandoned.

FIELD OF THE INVENTION

This invention relates to the field of supervisory apparatus, and more particularly to a readily portable mass spectrometer for use in apparatus which performs a supervisory function, such as indicating, recording, or controlling, in accordance with the presence or magnitude of one or more selected components in a gas sample.

DESCRIPTION OF THE PRIOR ART

A mass spectrometer is an arrangement for sorting streams of electrified particles in accordance with their different masses by means of deflecting fields which comprise a mass filter. It consists of a chamber through which the particles are caused to pass while subjected to the deflecting fields, together with means for supplying the particles of the material to be studied, means for establishing the fields, and means for receiving and detecting the arrival of particles after they have traversed the fields. The chamber must be maintained at such a low pressure as will result in a mean free path for the particles which is comparable with the distance they must travel for effective interaction with the fields.

When particles of several different mass numbers are supplied to the chamber, only those of a particular mass number determined by the deflecting fields are detected: all others are in effect rejected by the mass filter. If the low pressure in the chamber is to be maintained, the rejected particles must be removed from chamber as rapidly as new particles are admitted.

As a refinement, it is known to vary the fields so that particles of a number of predetermined masses, if present, reach the detecting means sequentially in an order determined by the field variation.

Mass spectrometers have been used in continuous communication with a volume of gas whose composition is to be studied: when this is done with a gas at generally atmospheric pressure (hereafter referred to as an atmospheric gas) the continuous admission of the sample must be accompanied by continuous pumping to retain the chamber evacuation. To avoid unreasonably great pumping requirements it is customary to provide an input device between the volume to be studied and the spectrometer chamber. Presently known input devices include pressure dropping arrangements—such as capillary tubes, porous elements and exceedingly minute apertures—and also include pumped manifolds. These arrangements continuously permit gas to enter the chamber and determine the rate of gas entry and hence the pumping capacity required.

For practical pumping rates, the volume of a suitable capillary tube (or porous element) is significant as a limitation on the minimum sampling interval since the entire content of the tube must be taken into the chamber before any change in the composition of the gas volume outside the chamber can be detected. Moreover, the composition of the gas reaching the chamber may not be the same as that of the volume being investigated, due to differential absorption or adsorption, or to condensation in or on the passage surfaces, or to the release or entrainment of components previously so extracted. Minute apertures are difficult to produce with dimensional predictability, and if of sufficiently small size to result in a reasonable pumping capacity are extremely subject to stoppage by foreign particles in the atmospheric gas, a very serious defect where combustion gas composition or air pollution is the subject of the investigation. Pumped manifolds share the above defects or capillary tubes, and considerably increase both the complexity of the equipment and the required pumping capacity.

SUMMARY OF THE INVENTION

My invention comprises an improved mass spectrometer for use with atmospheric gases in which sampling is accomplished by a pulsed aperture. The expression "pulsed aperture" is used herein to mean an opening of greater than capillary size which is normally closed in substantially leak-type fashion, but which may be quickly opened upon the occurrence of a brief pulse of electrical energy supplied thereto, and which remains open for the duration of the pulse. The expression thus contemplates not merely the opening or passage but the member in which the passage is formed, the clapper, shutter, or poppet by which the passage is normally closed, and the electrically actuable means for causing the aperture to be opened while the pulse is being received. The aperture ideally has a negligible dimension in the direction of gas flow therethrough, and opens directly into the atmospheric gas for cyclically recurring brief intervals. Its cross-sectional area is relatively large so that when it is open the atmospheric gas enters the spectrometer freely without appreciable time lag and with minimum opportunity for absorption of sample in surfaces: on the other hand, its duty cycle is so chosen that the amount of gas admitted during its open interval does not raise the pressure in the spectrograph unduly, and is removed by operation of the spectrometer pump before the succeeding opening of the aperture. When closed, my pulsed aperture forms a very vacuum-tight seal, and the average rate of gas admission to the chamber has been found to be low enough to fall within the capability of a getter-ion pump. The use of this type of pump results in a light, compact instrument which can be pumped down to operating vacuum at the factory or at some service location and then transported to and used in any remote location where accessory pumping equipment is not available. Moreover, by pulsing the mass filter or the detector of the spectrometer, severally or in combination, in synchronism with the aperture, even more efficient operation may be accomplished.

The principal advantages of my new structure are due to the fact that it acts as an input device of negligible gas volume. This means that each sample admitted is truly representative of the atmospheric gas at that instant, even though the latter may be changing rapidly, and is uninfluenced by residuals from the previous sampling or by modification during the sampling process, as by absorption. Accordingly, my instrument may be used in heretofore impossible transient situations, as for the analysis of fast flowing gases or for atmospheric analyses from moving vehicles.

BRIEF DESCRIPTION OF THE DRAWING

Various objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a part hereof, and to the accompanying descriptive matter, in which I have illustrated and described certain preferred embodiments of my invention.

In the drawing,

FIG. 1 shows my improved mass spectrometer in block diagram form, and

FIG. 2 is a schematic fragmentary showing which includes details of one embodiment of my invention.

DESCRIPTION OF THE PREFERRED EMBODIMENT

FIG. 1 shows my mass spectrometer to comprise a pulsed evacuated chamber 10 which includes an aperture 11, an ionizer 12, a mass filter 13, an ion detector 14, and a getter-ion pump 15. Associated with the above are a timer 16, a utilization device 17, and a power supply 20 energized in conventional fashion through a cable 21 and supplying DC, AC, and RF energy to timer 16 through a cable 22. Chamber 10 is placed in free communication with the ambient atmosphere during intervals of energization of aperture 11, the chamber having initially been pumped down to a nominal low pressure by a suitable vacuum pump connected to a tubulation 24 including a closure 25. Aperture 11 forms a vacuum-tight seal when unenergized.

Pump 15 is of well-known construction, and operates to remove gas molecules from its environment by burying them in a layer of material such as titanium continuously supplied by evaporation by a suitable source. In active gases the action is primarily one of gettering, titanium being a suitable getter material for this purpose. For inactive gases, the pump operates to ionize the gas: the ions are then transported by electrostatic or magnetic field attraction to the titanium layer where they also are buried in the continuously depositing titanium. The necessary evaporation and ionizing power is supplied to pump 15 through cable 26 from power supply 20.

Pumps of this sort can be constructed with various pumping capacities. The low pressure required in chamber 10 for efficient operation of elements 12, 13, 14 and 15 is known. The desired sampling rate for any application of the instrument is also known, and these factors, considered together, are used to determine the combination of bore and pulsing rate for aperture 11. The pressure in the chamber increases relatively rapidly from the nominal value during the open interval of aperture 11, and the bore of the aperture must be chosen so that this pressure does not become so large as to adversely affect the operation of the various units.

Continued operation of pump 15 after closure of aperture 11 reduces the pressure in chamber 10 relatively slowly to its nominal low value before aperture 11 is again energized. Aperture 11 is energized by timer 16 through cable 27, to open repetitively for brief spaced intervals such that pump 15 is able to remove, in the intervening time, a quantity of gas equal to that admitted during each interval. The average pressure and density of gas in chamber 10 therefore do not vary unduly for sampling rates of practical magnitude.

For purposes of illustration, one possible embodiment of the invention is shown in fragmentary detail in FIG. 2. When aperture 11 is energized poppet 30 is moved out of engagement with a jewel 31, opening a passage 32. The composition of the gas ambient to poppet 31 is the same as that of the general atmosphere outside of tube 10. The differential between the internal and external pressures injects gas into ionizer 12 through passage 32. An annular thermoemissive filament 33 is mounted with respect to an annular reflector 34 so as to emit electrons which travel through a conical accelerating grid 35 to a hollow collector 36. The jet of entering gas impinges on the cone of electrons suggested at 37, 37. As a result many of the gas molecules are ionized. The positive ions are repelled from the positive collector 36 and pass through the annular filament 33, a decelerating grid 39, a screen grid 40, and a focusing electrode 41, from which a beam of the ions passes through an aperture 42 into mass filter 13. It will be appreciated that different ions have different mass numbers, that is, they constitute different atomic mass units (AMU). Ion detector 14, which may advantageously include an electron-multiplier, is incapable of distinguishing between different ions, and merely gives an instantaneous output on cable 43, determined by the total number of ions reaching it at any particular instant.

Mass filter 13 functions to prevent any ions from reaching detector 14 except those of a selected AMU number. The type of mass filter used is immaterial to my invention, which can be arranged to cooperate with a magnetic sector, an omegatron, a time-of-flight filter, a monopole, or a quadrupole. The preferred embodiment of my invention shown in the drawing makes use of a quadrupole mass filter, which is provided with the necessary RF and DC voltages from source 20 directly, through cable 48, or under the control of timer 16, through cables 44 and 45.

The operation of quadrupole mass filters is well known, and further information thereon may be found in an article by W. M. Brubaker et al., entitled, "Performance Studies of A Quadrupole Mass Filter," published in Volume 35, No. 8 of the Review of Scientific Instruments for August 1964, beginning on page 1007.

As will be readily understood by those skilled in the use of mass spectrometers, the frequency of the RF supplied to filter 13 and the ratio of its amplitude to the magnitude of the DC also supplied determines the AMU number of the ions which the filter permits to pass to detector 14. It is also understood that by holding the voltages constant and sweeping the frequency, or by holding the frequency constant and sweeping the voltages while maintaining their ratio constant, the filter will permit ions of regularly increasing (or decreasing) AMU number to pass in succession. The electron multiplier output for each sweep is a variable having peaks located in time, relative to the beginning of the sweep, in a fashion to identify the materials of serially changing AMU numbers: the magnitudes of the peaks are representative of the amounts of the various materials present in the sample. A new mass filter sweep is initiated for each operation of the pulsed aperture.

Ionizer 12 is shown as energized from power supply 20 to a cable 46, and similarly detector 14 is shown as energized through cable 47. Somewhat more efficient operation of the system may be obtained if portions of units 12 and 14 are not continuously energized, but are energized concurrently with aperture 11 through timer 16, as suggested by cables 50 and 51.

In operation, my invention functions as follows. At the factory, or prior to use, tubulation 24 is connected to suitable vacuum pumping equipment, closure 25 is opened, and the pressure in the chamber is reduced to the nominal low value, of $10^{-8}$ to $10^{-9}$ torr. Closure 25 is then closed, and the unit is disconnected from the pump: it may now be transported to the utilization area. Power supply 20 is energized and the device is positioned to sample the gas of interest.

After a stable condition of the spectrometer is achieved, timer 16 is set in operation: aperture 11, ionizer 12, and detector 14 are fully energized, and a voltage or frequency sweep is commenced in filter 13. Sample gas passes through aperture 11 into ionizer 12: the entering molecules are presented directly in the ionizing area and ions result in quantity representative not of the average density of the gas in the chamber, but of the higher density of the gas emerging from the aperture. The resulting ions pass into filter 13, the stream of ions continuing for about 100 microseconds, which is a typical open period of aperture 11. The transit time in filter 13, for ions of differing AMU numbers up to 70, is from about 2 to 20 microseconds and the voltage sweep is initially at such a value that ions of low AMU numbers pass to detector 14, if any are present, to give a peak in the detector output. The sweep continues enabling the successive passage through the filter of atoms of higher AMU numbers, with associated output peaks, until the desired range of the instrument has been traversed.

Aperture 11 is now deenergized and closes. Continued operation of pump 15, at first at a higher pumping rate because of the higher pressure in the chamber, acts to reduce the pressure until by the time aperture 11 is again energized the pressure has regained its nominal value. At any time thereafter aperture 11 may again be energized, and a new sampling of the atmosphere ambient to tube 10 takes place.

Device 17 may take any desired form, depending on the application of the instrument. It may indicate or record the value of a single peak, or those of a number of peaks within a certain range, or it may even act to control a valve, for example, to maintain the level of a particular material at a particular value.

For the sake of completeness, the attached table gives parameters of one embodiment of the invention:

it is presented by way of illustration only and the parameters must be understood to vary widely depending on the particular application of the invention.

TABLE I

| ILLUSTRATIVE PARAMETERS | |
|---|---|
| General | |
| Mass range | 1-65 AMU |
| Resolving power | 100 |
| Sensitivity | 1ppm |
| Volume of chamber 10 | 73.9 cm$^3$ |
| Outside diameter of chamber 10 | 1" |
| Range of pressure in chamber 10 | $10^{-4}$ to $10^{-9}$ torr |
| Detector 14 | electron multiplier |
| Pulsed Leak 11 | |
| Minimum pulsing interval | 1 second |
| Pulse length | 100 microseconds |
| Aperture bore | .0024" |
| Delivery per pulse | 3 × $10^{14}$ molecules (0.5 nanomoles) |
| Ionizer 12 | |
| Filament 33 (cathode) | 6v 0.25a |
| Aperture 42 | ground |
| Filament 33 | −100v |
| Reflector 34 | −108v |
| Grid 35 | ground |
| Collector 36 | +120v |
| Grid 39 | +10v |
| Grid 40 | ground |
| Focus Electrode 41 | +4v |
| Energy of output ions | 10ev |

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. A mass spectrometer including means supplying short electrical pulses occurring at intervals which are widely spaced compared to the pulse length, and means connected thereto for placing the spectrometer in substantially free connection with a gas to be analyzed only during said pulses, and sealing off said connection except during said pulses.

* * * * *